(12) United States Patent
Hegler et al.

(10) Patent No.: US 10,883,638 B2
(45) Date of Patent: Jan. 5, 2021

(54) PIPE END FITTING WITH IMPROVED VENTING

(71) Applicant: Trinity Bay Equipment Holdings, LLC, Houston, TX (US)

(72) Inventors: Matthew Allen Hegler, Houston, TX (US); Andrew James Heaton, Lincolnshire (GB)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 66 days.

(21) Appl. No.: 16/249,641

(22) Filed: Jan. 16, 2019

(65) Prior Publication Data

US 2019/0145564 A1   May 16, 2019

Related U.S. Application Data

(62) Division of application No. 13/644,891, filed on Oct. 4, 2012, now Pat. No. 10,184,603.

(Continued)

(51) Int. Cl.
*F16L 35/00* (2006.01)
*F16L 13/02* (2006.01)
(Continued)

(52) U.S. Cl.
CPC ............... *F16L 35/00* (2013.01); *F16L 9/19* (2013.01); *F16L 13/02* (2013.01);
(Continued)

(58) Field of Classification Search
CPC . F16L 9/19; F16L 39/00; F16L 39/005; F16L 2101/30
(Continued)

(56) References Cited

U.S. PATENT DOCUMENTS 2,350,867 A   6/1944   Bean
2,425,211 A   8/1947   Strickland, Jr.
(Continued)

FOREIGN PATENT DOCUMENTS

AU   2012318605   11/2018
CA   2360498   5/2001
(Continued)

OTHER PUBLICATIONS

China National Intellectual Property Administration; Office Action, issued in connection to application No. 201910229442.6; 5 pages; China.

(Continued)

*Primary Examiner* — Matthew Troutman
*Assistant Examiner* — Fannie C Kee
(74) *Attorney, Agent, or Firm* — Greenberg Traurig, LLP; Dwayne Mason; Ira Hatton

(57) ABSTRACT

A pipe end fitting assembly that includes an outer body having an outer surface, an inner surface defining a first bore, and an end surface, and an inner body having an inner surface defining a second bore and an outer surface. A portion of the inner body outer surface is secured to the outer body inner surface. A passage formed in the outer body includes a first portion extending from the end surface and parallel to the first bore, and a second portion extending from the outer body outer surface to the passage first portion. A pipe end is disposed around and secured to a portion of the inner body outer surface. A jacket is disposed around the pipe and has an end secured to the outer body outer surface. The passage portions are in fluid communication with each other and a space between the jacket and the pipe.

9 Claims, 2 Drawing Sheets

Related U.S. Application Data

(60) Provisional application No. 61/543,247, filed on Oct. 4, 2011.

(51) Int. Cl.
*F16L 9/19* (2006.01)
*F16L 39/00* (2006.01)
*F16L 33/207* (2006.01)

(52) U.S. Cl.
CPC ......... *F16L 33/2071* (2013.01); *F16L 39/005* (2013.01); *Y10T 29/49879* (2015.01); *Y10T 29/49968* (2015.01)

(58) Field of Classification Search
USPC ..... 285/45, 55, 96, 123.15, 129.1, 242, 256, 285/288.1–288.5, 924
See application file for complete search history.

(56) References Cited

U.S. PATENT DOCUMENTS

| | | | |
|---|---|---|---|
| 2,707,388 | A | 5/1955 | Kent |
| 2,748,869 | A | 6/1956 | Hager |
| 2,840,262 | A | 6/1958 | William |
| 3,736,633 | A | 6/1973 | Kalen |
| 4,078,832 | A | 3/1978 | Wittman |
| 4,200,312 | A | 4/1980 | Watkins |
| 4,569,540 | A | 2/1986 | Beson |
| 4,671,542 | A | 6/1987 | Juchnowski |
| 5,224,738 | A | 7/1993 | Taga |
| 5,624,140 | A | 4/1997 | Allen et al. |
| 5,904,381 | A | 5/1999 | Ohmi et al. |
| 6,039,066 | A | 3/2000 | Selby |
| 6,283,384 | B1 | 9/2001 | Wyant et al. |
| 6,374,863 | B1 | 4/2002 | Friederich |
| 6,588,806 | B2 | 7/2003 | Arosio |
| 6,705,351 | B2 | 3/2004 | Fraser |
| 6,814,340 | B2 | 11/2004 | Arosio |
| 6,827,375 | B2 | 12/2004 | Fraser |
| 6,889,715 | B2 | 5/2005 | Fraser et al. |
| 6,899,140 | B2 | 5/2005 | Fraser et al. |
| 7,055,551 | B2 | 6/2006 | Fraser et al. |
| 7,107,662 | B1 | 9/2006 | Levarlo |
| 10,184,603 | B2 | 1/2019 | Hegler |
| 2003/0006392 | A1 | 1/2003 | Arosio |
| 2003/0111839 | A1 | 6/2003 | Fraser |
| 2008/0036204 | A1 | 2/2008 | Fisher et al. |
| 2011/0109079 | A1 | 5/2011 | Hegler et al. |
| 2011/0186305 | A1 | 8/2011 | Wilde |
| 2013/0291988 | A1 | 11/2013 | Hegler |
| 2019/0145563 | A1 | 5/2019 | Hegler |

FOREIGN PATENT DOCUMENTS

| | | |
|---|---|---|
| CA | 2850665 | 2/2017 |
| CN | 1336994 | 2/2002 |
| CN | 103988008 | 8/2014 |
| CN | 109915671 | 6/2019 |
| CO | 14-087836 | 12/2015 |
| EA | 30167 | 6/2018 |
| EP | 1899721 | 3/2008 |
| EP | 2354439 | 8/2011 |
| EP | 2764287 | 8/2014 |
| JP | H110148280 | 6/1998 |
| MX | 353187 | 1/2018 |
| WO | 01/38769 | 5/2001 |
| WO | 2013/052639 | 4/2013 |

OTHER PUBLICATIONS

Kingdom of Bahrain, Ministry of Industry, Commerce and Tourism; Patent Application Substantive Examination Result Notice, issued in connection to application No. 20140038; dated Dec. 25, 2019; 9 pages; Bahrain.

Chinese Patent Office; Rejection Decision, issued in connection to CN201280048714.9; dated Dec. 27, 2016; 14 pages; China.

Chinese Patent Office, Patent Reexamination Board; Board Opinion, issued in connection to CN201280048714.9; dated Jan. 25, 2018; 8 pages.

Chinese Patent Office, Patent Reexamination Board; Second Board Opinion, issued in connection to CN201280048714.9; dated Sep. 5, 2018; 3 pages.

Chinese Patent Office; Rejection Decision, issued in connection to CN201280048714.9; dated Dec. 26, 2018; 18 pages; China.

Malaysian Patent Office; Substantive Examination Adverse Report and Search Report, issued in connection to application No. PI2014000989; dated Jan. 15, 2018; 4 pages; Malaysia.

Malaysian Patent Office; Substantive Examination Clear Report, issued in connection to application No. PI2014000989; dated Nov. 15, 2018; 2 pages; Malaysia.

Korean Intellectual Property Office; Examination Report, issued in connection to application No. 329/2014; dated Oct. 17, 2018; 8 pages; Korea.

Korean Intellectual Property Office; Search Report, issued in connection to application No. 329/2014; dated Oct. 17, 2018; 5 pages; Korea.

Mexican Patent Office; Official Action, issued in connection to application No. MX/a/2014/004023; dated Feb. 22, 2017; 4 pages; Mexico.

European Patent Office; Communication Pursuant to Article 94(3) EPC, issued in connection to EP12838818.8; dated Feb. 15, 2019; 4 pages; Europe.

Ministry of Commerce and Industry, Sultanate of Oman; Office Action, issued in connection to application No. OM/P/2014/00070; dated Oct. 2, 2017; 5 pages; Oman.

Indian Patent Office; First Examination Report, issued in connection to application No. 3440/DELNP/2014; 6 pages; dated Dec. 20, 2018; India.

Indonesian Patent Office; Substantive Examination Report, issued in connection to application No. 300201402375; dated Jan. 21, 2019; 3 pages; Indonesia.

Australian Government, IP Australia; Examination Report No. 2 for your Standard Patent Application, issued in connection to AU2016208363; dated Jul. 11, 2018; 5 pags; Australia.

Australian Government, IP Australia; Examination Report No. 1 for your Standard Patent Application, issued in connection to AU2016208363; dated Jul. 19, 2017; 4 pages; Australia.

Canadian Intellectual Property Office; Examiner Report, issued in connection to CA2954887; dated Sep. 26, 2018; 5 pages; Canada.

Australian Government, IP Australia; Examination Report No. 1 for your Standard Patent Application, issued in connection to AU2018206739; dated May 17, 2019; 4 pags; Australia.

United States Patent and Trademark Office; PCT International Search Report, issued in connection to PCT/US12/58713; dated Jan. 4, 2013; 2 pages; U.S.

United States Patent and Trademark Office; PCT Written Opinion of the International Searching Authority issued in connection to PCT/US12/58713; dated Jan. 4, 2013; 5 pages; U.S.

Colombian Patent Office; Office Action, issued in connection to Colombian Patent Application No. 14-087.836; dated May 16, 2015; 21 page; Colombia.

European Patent Office; Extended European Search Reprot, issued in connection to EP12838818.8; dated Jul. 14, 2015; 6 pages; Europe.

The Eurasian Patent Organization; Official Action, issued in connection to Eurasian Patent Application No. 201490686/31; dated Nov. 25, 2015; 4 pages; Russia.

Australian Government, IP Australia; Patent Examination Report No. 2, issued in connection to Australian Patent Application No. 2012318605; dated Jan. 14, 2016; 3 pages; Australia.

Canadian Intellectual Property Office; Office Action, issued in connection to Canadian Patent Application No. 2,850,665; dated Feb. 3, 2016; 4 pages; Canada.

National Institute of Industrial Property of Brazil; Office Action, issued in connection to application No. BR112014008175-1; dated Apr. 1, 2020; Brazil.

(56) References Cited

OTHER PUBLICATIONS

European Patent Office; Communication Pursuant to Article 94(3) EPC, issued in connection to EP12838818.8; dated Dec. 18, 2019; 4 pages; Europe.

PIPE END FITTING WITH IMPROVED VENTING

RELATED APPLICATIONS

This application is a divisional of U.S. Non-Provisional application Ser. No. 13/644,891 filed on Oct. 4, 2012, which claims the benefit of U.S. Provisional Application No. 61/543,247, filed Oct. 4, 2011, the contents of each of which are incorporated by reference herein in their entirety

FIELD OF THE INVENTION

The present invention relates to pipe end fittings, and more particularly to a pipe end fitting for use with pipes having an external jacket for capturing any leaked liquid or gas.

BACKGROUND OF THE INVENTION

FIG. 1 is a cross sectional view illustrating a conventional pipe end fitting 1. The end fitting 1 is machined from a single piece of stock, such as carbon or stainless steel. The end fitting includes a center bore 2, a securing end 4 and a pipe attachment end 6. An annular connector notch 12 is formed on the outer surface near the securing end 4 for securing the end fitting 1 to its destination (e.g. a well head valve). The fitting 1 also includes a serrated pipe connector 14 at the pipe attachment end 6 for receiving and securing the end of an inner pipe 16 of a pipe assembly 18. The pipe assembly 18 additionally includes a jacket 20 surrounding the inner pipe 16. Jacket 20 provides a compression fit for the connection of the pipe assembly 18 to end fitting 1, and captures any liquids or gasses that may have leaked from the inner pipe 16. A weld 22 is used to secure jacket 20 to the end fitting 1. The jacket 20 includes a vent port 24 extending therethrough near the weld 22. The vent port 24 is used to vent any leaked liquid/gasses captured by the jacket 20.

There are several disadvantages of the illustrated conventional end fitting 1. Because of the length and width of the end fitting 1, machining the end fitting 1 from a single piece of stock material is costly, time consuming, and wasteful of stock material. In addition, the vent port 24 formed in the jacket 20 can be deformed during the swage process used to mount the pipe assembly 18 to the end fitting 1, which can cause the vent port 24 to leak.

There is a need for an improved end fitting that addresses the above mentioned issues.

BRIEF SUMMARY OF THE INVENTION

The aforementioned problems and needs are addressed by a pipe end fitting assembly that includes an outer body having an outer surface, an inner surface defining a first bore, and an end surface extending between the inner and outer surfaces. An inner body has an inner surface defining a second bore and an outer surface, wherein a first portion of the inner body outer surface is secured to the outer body inner surface. A passage is formed in the outer body extending from the end surface to the outer surface of the outer body, wherein the passage includes a first portion extending from the end surface and parallel to the first bore, and a second portion extending from the outer surface of the outer body to the first portion of the passage, wherein the first and second portions of the passage are in fluid communication with each other.

In another aspect of the invention, a pipe assembly includes an outer body having an outer surface, an inner surface defining a first bore, and an end surface extending between the inner and outer surfaces. An inner body has an inner surface defining a second bore and an outer surface, wherein a first portion of the inner body outer surface is secured to the outer body inner surface. A passage is formed in the outer body extending from the end surface to the outer surface of the outer body, wherein the passage includes a first portion extending from the end surface and parallel to the first bore, and a second portion extending from the outer surface of the outer body to the first portion of the passage. A pipe has an end disposed around and secured to a second portion of the inner body outer surface. A jacket disposed around the pipe and having an end secured to the outer body outer surface. The first and second portions of the passage are in fluid communication with each other and with a space extending between the jacket and the pipe.

In yet another aspect of the invention, a method of forming a pipe assembly includes forming an outer body having an outer surface, an inner surface defining a first bore, and an end surface extending between the inner and outer surfaces, forming a passage in the outer body extending from the end surface to the outer surface of the outer body, wherein the passage includes a first portion extending from the end surface and parallel to the first bore, and a second portion extending from the outer surface of the outer body to the first portion of the passage, forming an inner body having an inner surface defining a second bore and an outer surface, securing a first portion of the inner body outer surface to the outer body inner surface, securing an end of a pipe around and to a second portion of the inner body outer surface, and securing an end of a jacket to the outer body outer surface, wherein the jacket is disposed around the pipe. The first and second portions of the passage are in fluid communication with each other and with a space extending between the jacket and the pipe.

Other objects and features of the present invention will become apparent by a review of the specification, claims and appended figures.

DETAILED DESCRIPTION OF THE INVENTION

Figure 2:
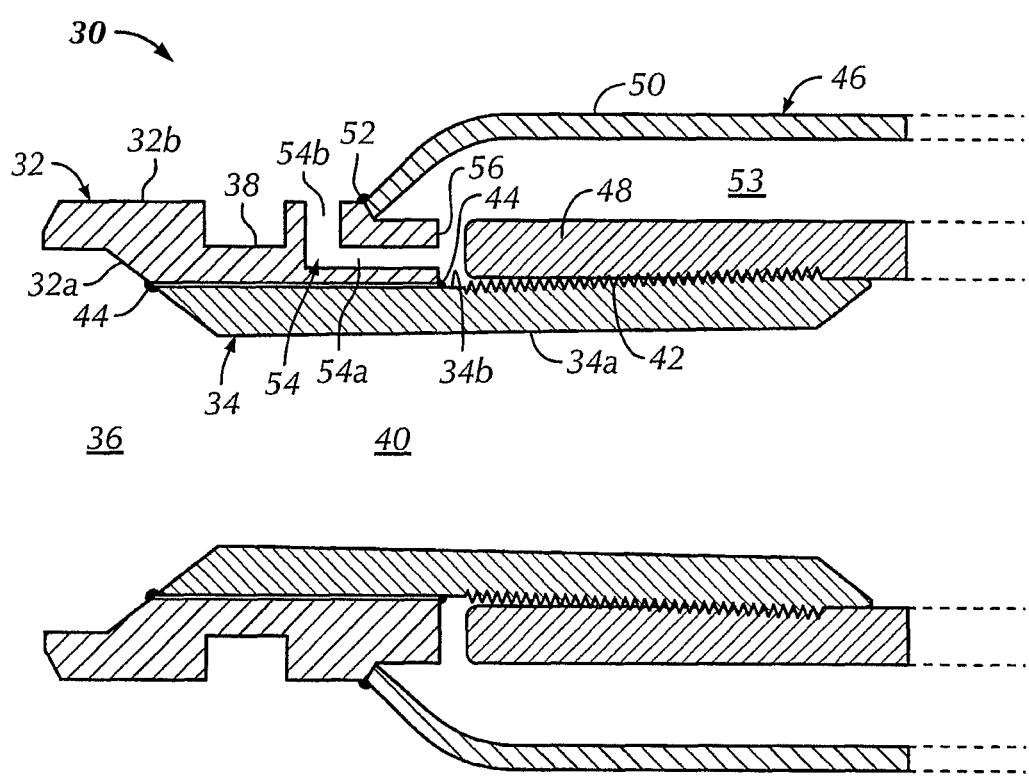
FIG. 2 is a side cross sectional view of the pipe end fitting assembly of the present invention.

The present invention is pipe end fitting assembly 30, which is illustrated in FIG. 2. The pipe end fitting assembly 30 constitutes two separate components that are affixed to each other: the outer body 32 and the inner body 34.

The outer body 32 is generally cylindrically shaped having an inner surface 32a that defines a bore 36 extending longitudinally through the outer body. A connector notch 38 is formed on the outer surface 32b of outer body 32 (to facilitate connection to its destination). The inner body 34 is generally cylindrically shaped with an inner surface 34a that defines a bore 40 extending longitudinally through the inner body 34. One end of the inner body 34 has serrations on the outer surface 34b of the inner body 34, forming a serrated pipe connector 42 (for receiving and securing a pipe end). The other end of the inner body 34 is disposed in bore 36 and mounted to the outer body 32. Specifically, the outer surface 34b of inner body 34 is secured to the inner surface 32a of the outer body 32, preferably with a press-fit (i.e. shear force between the inner surface 32a of outer body 32 and the outer surface 34b of inner body 34, creating an interference fit therebetween). The interference fit can optionally be temperature enhanced, where one of the inner/outer bodies is heated and the other is cooled before being fitted together so additional compressive forces are generated after being fitted together as they equalize in temperature. Optional welds 44 can be formed at the edges of the inner/outer bodies 32/34, which constitute a redundant seal to contain pressurized liquids/gasses. Serrations or threads could additionally or alternatively be used to secure the outer and inner bodies 32/34 together for enhanced tensile capacity.

A pipe assembly 46 connects to the pipe end fitting 30. Pipe assembly 46 includes an inner pipe 48 and a jacket 50 surrounding the inner pipe 48. The end of the inner pipe 48 slides over and engages the serrated pipe connector 42. The end of the jacket 50 is secured to the outer body 32 by a weld 52. Any liquids or gasses that leak out of pipe 48 and into the space 53 between pipe 48 and jacket 50 are captured by jacket 50 and guided to the end fitting assembly 30.

Figure 1:
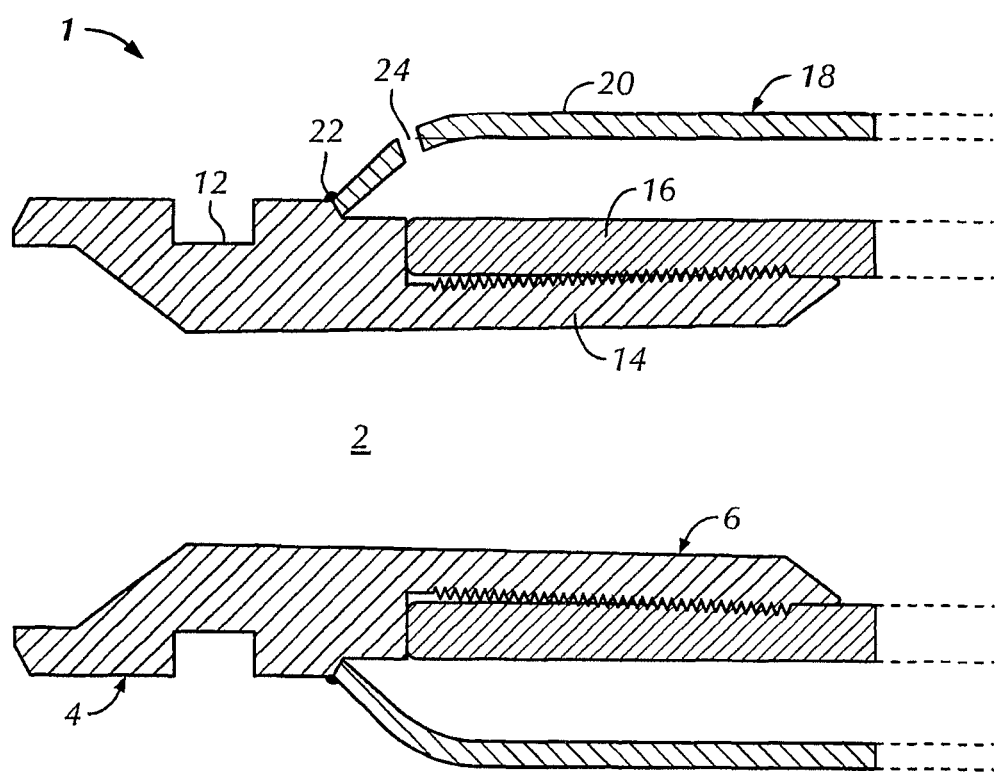
FIG. 1 is a side cross sectional view of a conventional pipe end fitting.

A vent passage 54 is formed through the outer body 32, providing venting for space 53. Preferably, passage 54 includes a first passage portion 54a extending longitudinally within the outer body 32 (parallel to bore 36), and a second passage portion 54b extending outwardly from the first passage portion 54a to the outer surface 32b of outer body 32 (i.e. first and second passage portions 54a/54b are orthogonal to each other). The formation of the first passage portion 54a was not feasible in the conventional design of FIG. 1 because the excessive length of the serrated pipe connector 14 blocked access to the surface in which such a passage could be made (i.e. most drilling or material removing machinery requires full access to the surface in which drilling or material removal is to be performed). However, with the design of FIG. 2, first passage portion 54a can be reliably made in outer body 32 before it is mounted to inner body 34, where end surface 56 of outer body 32 (into which first passage portion 54a is formed) is fully accessible. Likewise, second passage portion 54b is machined into the outer surface 32b of outer body 32 (which is fully accessible as well) until the two passage portions 54a/54b meet. Passage 54 provides fluid communication between space 53 and the outer surface 32b of outer body 32, where leaked liquids or gasses in space 53 can be vented and captured. The multi-portion passage 54 is far more reliable than the conventional technique of forming the vent port in the jacket itself, where unintended deformation and leaking can occur.

Another advantage of the forming end fitting assembly 30 using two separate bodies 32/24 attached together is the optimization/minimization of material stock used to make end fitting assembly 30. Smaller dimensioned stock material can be used to individually form the inner and outer bodies 32/24, which significantly lowers the amount of stock material that is wasted compared to machining the end fitting as a single piece of material. The machining processes for fabricating the inner and outer bodies 32/34 is simplified, making them faster and less expensive to make compared to the single piece end 10 fitting of FIG. 1.

It is to be understood that the present invention is not limited to the embodiment(s) described above and illustrated herein, but encompasses any and all variations falling within the scope of the appended claims. For example, references to the present invention herein are not intended to limit the scope of any claim or claim term, but instead merely make reference to one or more features that may be covered by one or more of the claims. Materials, processes and numerical examples described above are exemplary only, and should not be deemed to limit the claims. Further, as is apparent from the claims and specification, not all method steps need be performed in the exact order illustrated or claimed, but rather in any order that allows the proper formation of the pipe end fitting of the present invention.

What is claimed is:

1. A method of forming a pipe assembly, comprising:
   forming an outer body having an outer surface, an inner surface defining a first bore, and an end surface extending between the inner and outer surfaces;
   forming a passage in the outer body extending from the end surface to the outer surface of the outer body, wherein the passage includes a first portion extending from the end surface and parallel to the first bore, and a second portion extending from the outer surface of the outer body to the first portion of the passage;
   forming an inner body having an inner surface defining a second bore and an outer surface;
   securing a first portion of the inner body outer surface to the outer body inner surface;
   securing an end of a pipe around and to a second portion of the inner body outer surface;
   securing an end of a jacket to the outer body outer surface, wherein the jacket is disposed around the pipe; and
   forming serrations into the second portion of the inner body outer surface before the securing of the pipe thereto;
   wherein the first and second portions of the passage are in fluid communication with each other and with a space extending between the jacket and the pipe, wherein the outer body is a single piece, and wherein the first portion of the passage is a unitary first portion.

2. The method of claim 1, wherein the securing of the first portion of the inner body outer surface to the outer body inner surface is performed after the forming of the passage.

3. The method of claim 1, wherein the second portion of the passage extends orthogonally to the first portion of the passage.

4. The method of claim 1, wherein the first and second bores are cylindrically shaped.

5. The method of claim 1, further comprising:
   forming a weld between the end surface to the inner body outer surface.

6. The method of claim 1, wherein the first portion of the inner body outer surface terminates at a first end, and wherein the method further comprises:
   forming a weld between the first end and the outer body inner surface.

7. The method of claim 1, further comprising:
   forming a notch into the outer surface of the outer body.

8. The method of claim 1, wherein the inner body is disposed between the outer body and the second bore.

9. The method of claim 1, wherein the passage is unencumbered and allows for direct passage of liquid or gas therethrough.

* * * * *